United States Patent [19]

Lai

[11] 4,130,317
[45] Dec. 19, 1978

[54] SUN-CUT GLASS CLAMPING DEVICE FOR AUTOMOBILES

[76] Inventor: Winston Lai, No, 42, I-Tung St., Taipei, Taiwan

[21] Appl. No.: 819,334

[22] Filed: Jul. 27, 1977

[51] Int. Cl.² .......................... B60J 3/02; A44B 21/00
[52] U.S. Cl. ............................... 296/97 R; 24/81 AE; 24/243 R; 24/248 E; 24/254; 248/229
[58] Field of Search .............. 24/260, 81 AA, 81 AB, 24/81 BA, 81 AD, 81 AE, 243 R, 254, 248 E, 249 R, 252 R, 137 A; 248/324, 229; 296/97 C, 97 R, 97 B, 97 K, 97 G

[56] References Cited

U.S. PATENT DOCUMENTS

| 1,690,491 | 11/1928 | Knauff | 248/229 |
| 2,112,726 | 3/1938 | Kemp et al. | 296/97 C |
| 2,461,333 | 2/1949 | Maccaferri | 24/137 A |

FOREIGN PATENT DOCUMENTS 55548  9/1912  Australia ................................. 24/260

*Primary Examiner*—Kenneth J. Dorner
*Attorney, Agent, or Firm*—Blair, Brown & Kreten

[57] ABSTRACT

Disclosed herein is a structure for the holding of sun-reducing glass in an automobile. One feature is that the rotation of sun-reducing glass is so light and convenient that the sun-cut glass can be turned to any desired position. The clamping device can hold the sun-reducing glass firmly so that it is immovable during the continuous vibration of the vehicle and it won't disturb the view of a driver.

The clamping device is designed with two different retention points. Firstly, there is a lever action in the angular movement of the sun-cut glass. Applied force opens the spring clip so that the arms of the clip will not clamp the fixing shaft and a small force can be applied to the sun-reducing glass to move it to the required angle and position. Secondly, when there is no force to be applied on the sun-cut glass, the arm of the spring clip holds the fixing shaft firmly and thus, the sun-reducing glass is clamped firmly so that it is immovable.

Because of the function of lever and the adoption of a spring clip having a large clamping force to supply the applied force in the positioning, the turning of sun-reducing glass is very easy and the sun-glass reducing is immovable from vibration.

3 Claims, 7 Drawing Figures

SUN-CUT GLASS CLAMPING DEVICE FOR AUTOMOBILES

BACKGROUND OF THE INVENTION

There are three kinds of devices that are always installed in a vehicle as protection for the driver against the sting from light. One is a tinted belt-filter layer. On the windshield One is the visor for the sun-blind and the other is a sun-reducing glass, installed 35 cm in front of a driver.

The device in this invention is used for the clamping of this sun-reducing glass. The purpose of installation of this sun-reducing glass is to dilute the intensity of light from high angles. In other words, most of the lights from the upper angle are filtered and the intensity of light is gradually reduced through the glass. At the angle of viewing, only a little of light is filtered so that the driver can see in front clearly. Current clamping devices have a common disadvantage. If the clamping device clips the fixing shaft firmly. then the turning is difficult. If it can be easily turned, then the clamp is movable during the vibration in driving, to that the position of sun-reducing glass is changed. This invention is designed to resolve this disadvantage. Its improvement is that only a slight force is necessry to be applied in the turning of sun-reducing glass and when the sun-cut glass is not being turned, it uses the clamping force of the spring clip to hold it firmly. Its characteristics are the application and cooperation of the applied force from the lever principle and the clamping force through the reinforced spring clip.

SUMMARY OF THE INVENTION

The clamping device of this invention is an apparatus for holding sun-reducing glass in a vehicle that can be turn easily yet hold the glass firmly. It is designed with two, upper and lower clamping arms, and has a spring clip to clamp the clamping circular grooves of the clamping arms to a fixed shaft. These two upper and lower clamping arms are in ><form. Screws are set at the turning points of the arms to fix the distance between the turning points, and act as a pivot in a lever. When the spring clip at the left terminal is closed (i.e. the sun-reducing glass is not being turned), it form is like =<and the clamping arms clip the sun-reducing glass firmly. When force is applied to the sun-cut glass, the turning point (screw) acts as a pivot, opens the spring clip according to the lever principle. Then, the clamping is at the ><state. The clamping grooves do not hold the fixing shaft and so, the sun-reducing glass can be easily truned to any desired position.

BRIEF DESCRIPTION OF THE INVENTION

Figure 1:
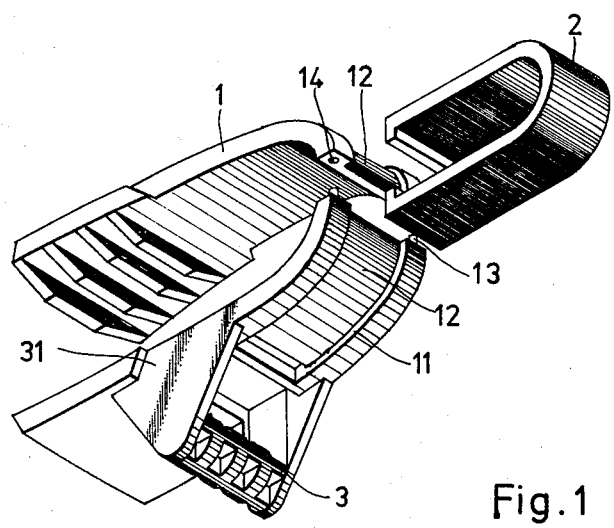
FIG. 1 is an illustration diagram of the holding clamp of this invention.

A list of components and terms:
(1) Upper tongue.
(11) Lower tongue.
(12) Hollow space.
(13) Proturbant point.
(14) Hollow opening.
(2) Spring clip A.
(3) Fixing shaft.
(31) Carrier.
(4) Clamping arm,
(41) Circular groove.
(42) Clamping plane.
(43) Proturbant terminal stop.
(44) Declination.
(45) Turning point.
(46) Reinforced cam.
(5) Spring clip B.
(6) Screw.
(61) Screw opening.
(7) Visor.
(8) Sun-reducing glass.

DESCRIPTION OF THE PREFERRED EMBODIMENT

The whole structure of this invention includes a holding clamp that holds the visor (7) of an automobile and a clamping device that holds the sun-reducing glass (8).

The holding clamp is composed of upper tongue (1), lower tongue (11), spring clip A (2) and a fixed shaft (3) on the lower tongue.

The clamping device is composed of two clamping arms (4), spring clip B (5) and screw(6).

Figure 2:
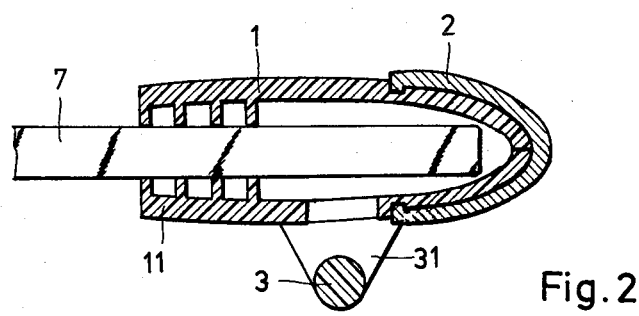
FIG. 2 is a sectional view of the holding clamp of this invention.

As shown in FIG. 1. there is a hollow space (12) for the holding of a spring clip A (2) on the upper tongue (1) and lower tongue (11) respectively. During the installation, insert the two protuberant points (13) to the two hollow holes (14) of the upper tongue and then, pull in the spring clip A (2) from the rear to the front till the presentting hollow space (12). FIG. 2. shows this holding clamp holds the sun-blind board (7).

There are two carriers (31) on the lower tongue (11), a fixing shaft (3) is at the middle of these two carriers. This fixing shaft is for the installation of clamping device, and provides fixing or rotation.

Figure 3:
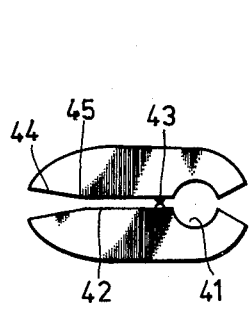
FIG. 3 shows the turning point at the two clamping arms of this invention.
Figure 4:
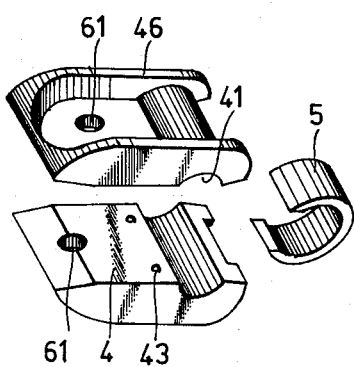
FIG. 4 is a three-quarter diagram of the clamping device of this invention shown in FIG. 3.

FIG. 3. shows an embodimental diagram of the disengaging structure of the clamping device, in which two symmetric arms are the clamping arms (4). The structure at the inner lateral of the clamping arms (4) is: The left terminal is a circular groove (41) of the same diameter with the fixed shaft (3). On the right is a plane for the holding of visor (8). There are tow protuberant terminal stops (13) on the holding plane (41) which is near the circular groove (41). On the right terminal of the clamping arm (4) is a declination (44), whose outer end is larger. The beginning of the declination (44) (right terminal of the clamping plane (44)) is a turning point (45) in which a screw opening (61) is drilled on it.

On the outer lateral portion of the clamping arm, a spring clip B (5) is inserted from the rear to form an engaging state. For inserting, one only has to pull and press the spring clip B (5) forwardly. This is because when the spring clip B (5) is in the clamping state, the surrounding curve is larger than 180° (practically it is 270°) and therefore, it is quite difficult to pull the spring clip B (5) out again. It is not necessary to remove the clip after installation (of course, it can be removed). In addition to the presetting position of the spring clip B (5) on the outer lateral of the clamping arm (4), there are protuberant reinforced cams on the other three sides. These cam have the function of reinforcing and in addition, they cause the spring clip B (5) be unable to move horizontally.

The internal diameter of the circular groove (41) of the aforesaid clamping arm is the same as the external diameter of the fixed shaft (3). When the spring clip B (5) is clipped (i.e., the sun-reducing glass is not being turned), the clamping arms (4), because of the clamping force of the spring, clamp the fixing shaft (3) firmly. Therefore, the sun-reducing glass is immovable. Conversely, when the sun-reducing glass (8) is turned (at the pivot of the turning point, fixed by the locking of screw), the left terminal of the clamping arm (4) is opened, the spring clip B (5) is opened and the clamping arms (4) do not clamp the fixing shaft (3) and so, one can turn the sun-cut glass to any desired position easily. When the applied force is stoped, the device is again at the clamping state and stays at the required position.

The purpose of the protuberant terminal stops is to make the sun-reducing glass form a definite angle against the clamping device. This is because when the sun-reducing glass is held at two points, it only receives applied forces from these two points and the clamping device is movable. With these protuberant terminal stops, the clamping device is immovable because of this constraint.

Figure 5:
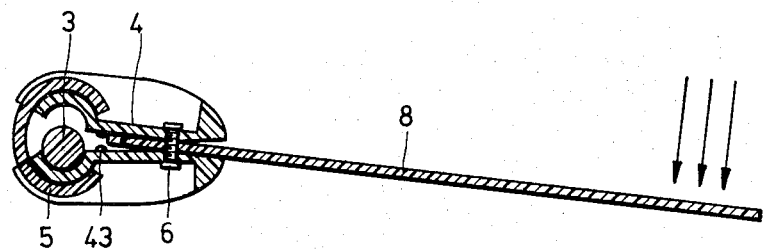
FIG. 5 is a sectional diagram of an application of the clamping device of this invention (at the pushing and pressing of sun-reducing glass).
Figure 6:
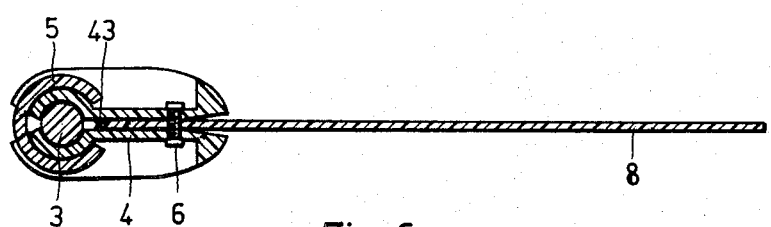
FIG. 6 is a sectional diagram of an application of the clamping device of this invention (without pushing and pressing the sun-reducing glass).
Figure 7:
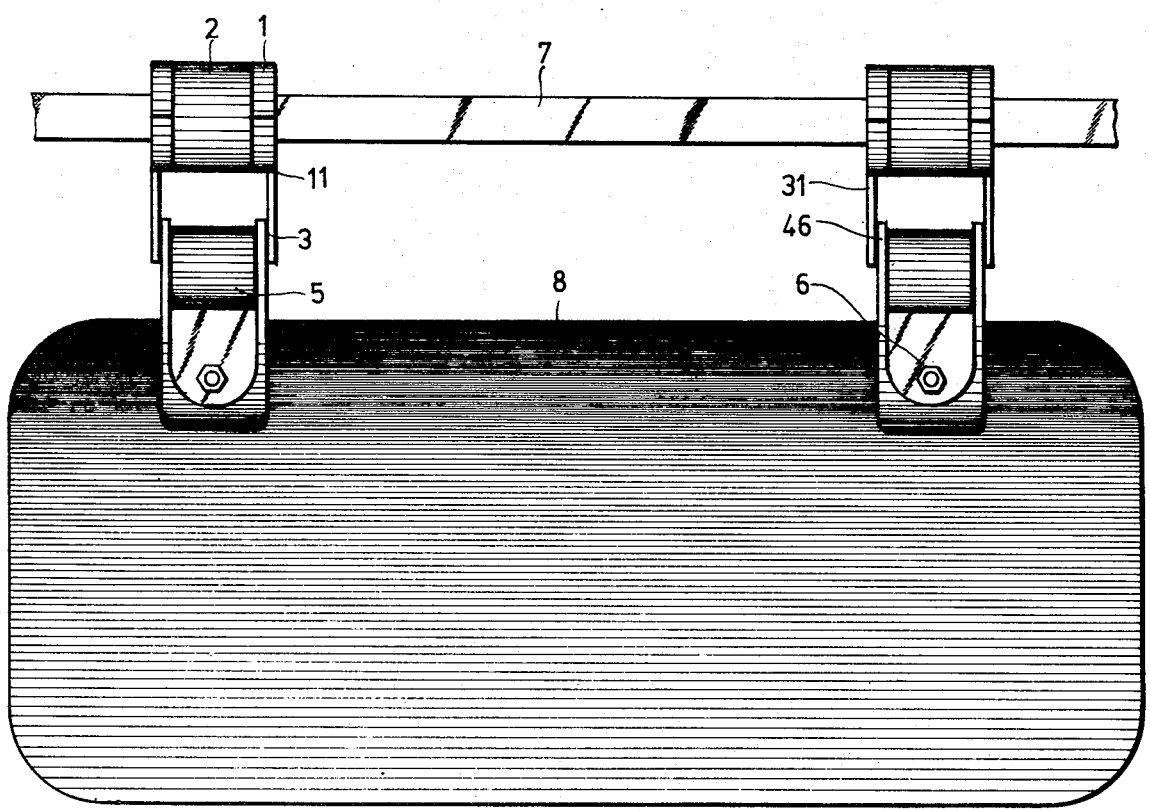
FIG. 7 is a view of the whole invention.

When one pushes and presses the sun-reducing glass, the sun-cut glass opens the inner lateral of the clamping arm upwards, the space between the upper and the lower declinations is as shown in FIG. 5. Because of the block of the sun-reducing glass, the clamping arms will not be opened anymore. (it is unnecessary to open it more).

The turning point is the intersection of the declination (44) and clamping place. There is a screw at this intersection and the purpose of setting this screw is to maintain a definite distance between the turning points that make it pivot effectively.

In conclusion, when this invention is adopted, after the visor is clipped, the sun-reducing glass is maintained at the actual position without regard to vibration of vehicle. In the turning, it will be easily turned because of the lever principle.

I claim:

1. A device for attachment to an automobile visor for reducing sun glare comprising tongue means having separable top and bottom sections which overlie an edge of the visor, said top section provided with at least two holes, said bottom section having at least two protuberant points which register with the two holes of said top section when said tongue means engages a visor, a first U-shaped spring clip adapted to pressure said top and bottom sections together so as to retain said tongue means on said visor, clamping arm means attached to a sun reducing glass having a second spring clip, and means connecting said tongue means with said clamping arm means, including a carrier depending from said tongue means, a fixing shaft fastened to said carrier and carried on said clamping arm means.

2. The device of claim 1 in which said clamping arm means comprises: symetrically formed top and bottom portions having a groove at one extremity thereof for receiving said fixing shaft, said spring clip biasing ends of said portions near said groove, an outwardly flared terminus remote from said groove, a hole proximate to said terminus, at least one protuberant stop near said groove whereby when said sun reducing glass is inserted into said clamping arm means at said terminus and up to said protuberant stop, screw means fasten said glass to said clamping arm means at said hole, and a turning moment applied on said glass remote from the clamping means causes said glass to release the spring clip retention by leverage and is applied at the outwardly flared terminus acting as a fulcrum against said spring clip, so that said clamping means can rotate about said fixing shaft.

3. The device of claim 2 in which there are two of said tongue means and clamping arm means disposed on said visor and said sun reducing glass.

* * * * *